United States Patent

[11] 3,624,367

| [72] | Inventors | Stephen B. Hamilton<br>Syracuse;<br>Robert J. Kelly, Jr., Binghamton; Robert C. Wells, Endwell, all of N.Y. |
|---|---|---|
| [21] | Appl. No. | 774,939 |
| [22] | Filed | Nov. 12, 1968 |
| [45] | Patented | Nov. 30, 1971 |
| [73] | Assignee | General Electric Company |

[54] SELF-OPTIMIZED AND ADAPTIVE ATTITUDE CONTROL SYSTEM
10 Claims, 13 Drawing Figs.

[52] U.S. Cl. ............................................. 235/150.2,
235/150.1, 235/150.21, 244/3.2, 244/3.21
[51] Int. Cl. .................................................. G06f 15/50,
F41g 9/00
[50] Field of Search ..................................... 235/150.2-25;
244/1.5 S, 3.18, 3.2, 3.21, 3.22

[56] References Cited
UNITED STATES PATENTS

| 3,149,270 | 9/1964 | Smyth et al. .................. | 235/150.2 X |
| 3,221,238 | 11/1965 | Unger et al. ................... | 235/150.2 X |
| 3,274,552 | 9/1966 | Harmon et al. ................ | 235/150.2 X |
| 3,350,548 | 10/1967 | Whitaker ....................... | 235/150.2 X |
| 3,362,658 | 1/1968 | Ito et al. ......................... | 235/150.2 X |

*Primary Examiner*—Malcolm A. Morrison
*Assistant Examiner*—Felix D. Gruber
*Attorneys*—Irving M. Freedman, Francis K. Richwine, Joseph B. Forman, Frank L. Neuhauser and Oscar B. Waddell

ABSTRACT: Technique, method and apparatus for obtaining optimized, self-adaptive, attitude control in space vehicles using on-off reaction motor propulsion for torquing the vehicle about its axes of attitude. Formulation to determine a time duration of known thrust to impart a calculated angular acceleration is based on angular velocities and is calculated from maximum permissible angular deviation, an appropriate lesser deviation, initial mass and initial thrust force as parameters and time as a universal variable. Technique provides for operation both in presence of and absence of directional bias forces and includes updating of data representing vehicle parameters. Disclosure includes one apparatus to accomplish the method by application of digital computation.

INVENTORS:
STEPHEN B. HAMILTON
ROBERT J. KELLY, JR
ROBERT C. WELLS
BY Francis K Richmond
ATTORNEY

INVENTORS:
STEPHEN B. HAMILTON
ROBERT J. KELLY, JR.
ROBERT C. WELLS

BY Francis K Richmond
ATTORNEY

INVENTORS:
STEPHEN B. HAMILTON
ROBERT J. KELLY, JR.
ROBERT C. WELLS

BY *Francis K Brehwine*

ATTORNEY

INVENTORS:
STEPHEN B. HAMILTON
ROBERT J. KELLY, JR.
ROBERT C. WELLS

BY *Francis K. Richmine*

ATTORNEY

INVENTORS:
STEPHEN B. HAMILTON
ROBERT J. KELLY JR.
ROBERT C. WELLS

BY Francis K Richmine
ATTORNEY

3,624,367

SELF-OPTIMIZED AND ADAPTIVE ATTITUDE CONTROL SYSTEM

BACKGROUND OF THE INVENTION

The field of invention is that portion of the art of guidance of space vehicles, both satellite and interplanetary, that controls the attitude of the vehicle about its principal axes to permit orientation of the vehicle in particular relationships with respect to space or other bodies in space.

Rotation of space vehicles about one or more axes of attitude for orientation in space is generally accomplished by an attitude control system using some form of mass expulsion but might include application of other reaction or inertial forces. Operation of a mass expulsion system is characterized by periodic activation of the system to apply a thrust impulse in response to a combination of sensed angular position, velocity and acceleration of the vehicle. Principal control systems for on-off mass expulsion actuators have been of the pseudorate type developed by Jet Propulsion Laboratory and used on Ranger and Mariner vehicles or of the lead-lag type. Both of these systems provide attitude stabilization by generating control thrust pulses which sequentially converge in pulse width to a fixed minimum thruster ontime. The absolute value of vehicle angular momentum can thus be reduced to a minimum value limit cycle, and a return minimum-duration thrust pulse is fired each time that the specified position error is reached. However, neither of these systems is sufficiently versatile to adjust adequately to all conditions. The pseudorate system is efficient in a very low bias torque or force field environment but the necessity to discharge an integrator prior to generating a subsequent pulse limits the thruster frequency sufficiently to inhibit attitude control in a high-bias environment. The lead-lag system on the other hand loses efficiency in a low bias environment because the minimum ontime is affected by thruster and electronic nonlinearities.

A variation of these systems which also converges to the minimum ontime of the thruster is that of pulse modulation using the control law of the lead-lag system but varying the frequency of firing of the fixed minimum ontime thrusts. Therefore the pulse modulation system approximates the pseudorate without loss of control for increased thruster frequency.

There is a need in the existing art for application to future space vehicle missions, especially those of long duration, for a system that actively minimizes the numbers of firings to prolong thruster life yet has a capability of producing an optimum attitude trajectory over the entire range of bias torques created by external influences and also of compensating for internal vehicle changes.

SUMMARY OF THE INVENTION

THis invention includes technique, method and apparatus for controlling on-off reaction motor or other attitude correction systems in space vehicles to minimize activations and to apply the optimum correction force under any circumstances. The permissible deviation from a desired attitude is established as a permissible zone bounded by maximum limits of rotation in each direction about the axis of any component of attitude. Secondary limits within the permissible zone and closer to "center" than the maximum limits are established at a predetermined amount of rotation less than the maximum to establish critical zones at the outer limits of permissible zone and a central zone or dead band within the secondary limits. Measurement of the time of rotation through the critical zones in both directions, deviation correction, and the time interval between successive penetrations of the critical zones is used with predetermined spacial quantities and with the values of the corrective force and the vehicle inertia to calculate the proper length of time for application of the corrective force to cause the attitude to return to the permissible zone and to remain in that zone as long as possible under any existing conditions. Two modes, i.e. absence of and presence of a bias force, are recognized in calculation of the force application time. The method also provides for recalculation of the effective value of the corrective force in the bias force mode. The apparatus disclosed accomplishes the method by use of threshold sensing and comparison, sequential logic and digital computation.

DETAILED DESCRIPTION OF THE INVENTION

Orbital and interplanetary space vehicles and space flights either need or can use stable or correctable vehicle attitude. As in aircraft, attitude is composed of stability and orientation of the vehicle about the roll, pitch and yaw axes. Although attitude may not be as important to passenger comfort in space as in strong gravity fields because of weightlessness, the attitude of the vehicle may under those circumstances be more important to navigation and to guidance.

A typical general attitude control system consists of reaction motors such as jet thrusters, an angular position sensor, and a control mechanism, often electronic. The thrusters are attached to the space vehicle in such a manner that turning them on in a particular combination will cause the vehicle to be torqued to rotate about a specific axis. The sensor may be of the observation type and have a field of view including a reference point from which the desired attitude of the vehicle can be determined. If the vehicle is not aligned on the desired reference, the sensor produces an electrical error signal as for example an analog voltage signal, which, when processed by the control electronics, will turn on the appropriate jet combination to correct the attitude error. In general, attitude deviation which could not be totally prevented without infinitely and minutely adjustable force levels, is allowed to increase to a predetermined level before the jet is activated to preclude firing the jet continuously so as to conserve fuel and to take advantage of the fact that some forces causing attitude deviation will neutralize others. Additionally, the rocking of the vehicle within a tolerance assists in the detection of the actualities of and variations in the force fields encountered. Within this attitude error tolerance or permissible zone, the vehicle is allowed to drift with respect to the reference orientation but is not allowed to drift outside the permissible zone. The tolerance typically might be one degree of arc. The motion of the vehicle between tolerance limits is determined by the force exerted by the reaction motors, the number of times the motors are activated to keep the spacecraft within the zone, the inertia of the vehicle, and the size of external forces such as solar pressure, aerodynamic drag or gravitational forces on the vehicle. The mission or flight path itself may in some instances create a condition of external influences affecting attitude. In the case of a space vehicle in an Earth orbit on a communication or photography mission requiring a particular orientation with respect to the Earth's surface, the orbital path causes a deviation of attitude that must be corrected. The flight path motion of the vehicle within the zone is called a limit cycle. The external disturbances are sometimes called bias torques.

Figure 1:
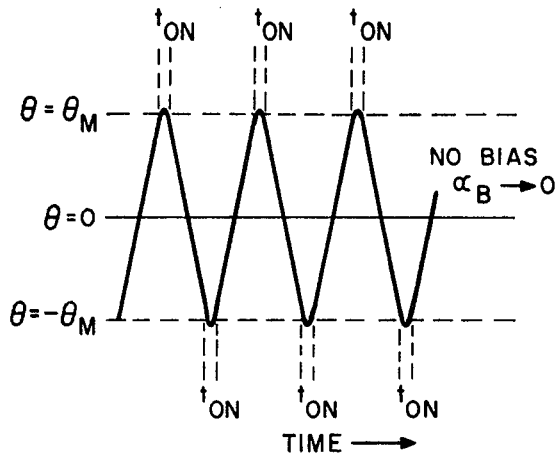
FIG. 1 is a graphic representation of the attitude limit cycle of a space vehicle without a self-optimizing and adaptive attitude control in an environment placing little or no attitude bias forces on the vehicle.
Figure 2:
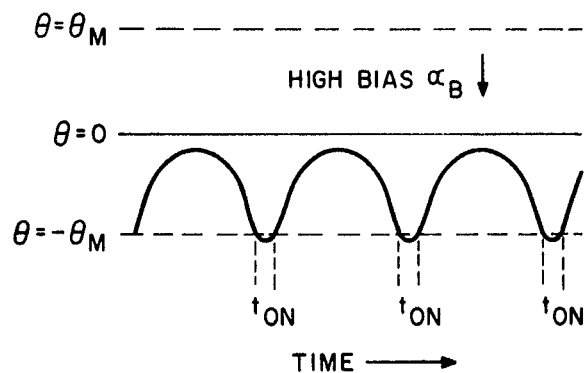
FIG. 2 is a graphic representation of the attitude limit cycle of a space vehicle without a self-optimizing and adaptive attitude control in an environment exerting a high bias force on the attitude of the vehicle.
Figure 3:
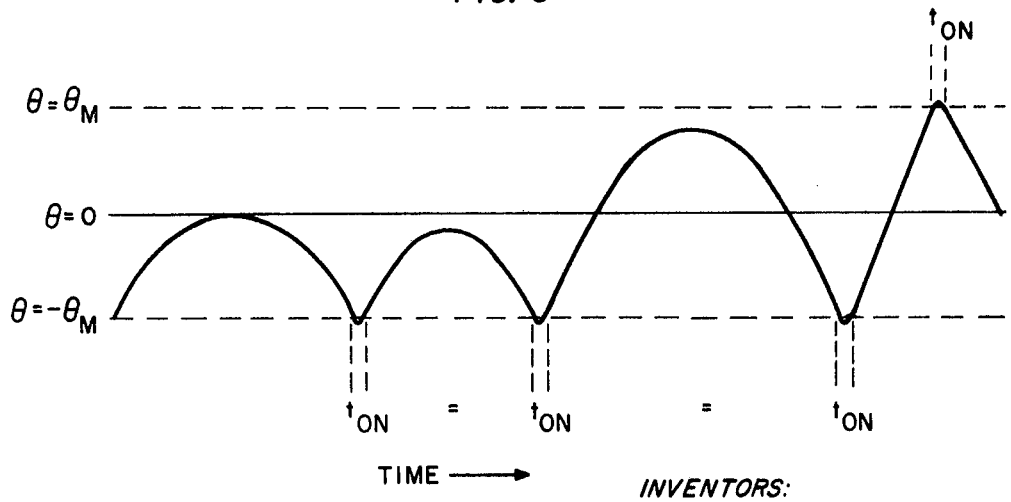
FIG. 3 is a graphic representation of a possible attitude limit cycle of a space vehicle without a self-optimizing and adaptive attitude control in an environment of changing forces.

Some typical limit cycles are shown in FIGS. 1-5. The space vehicle angular attitude about a single axis is plotted in these Figures as a function of time and the tolerance zone limits are denoted by the $\theta$ lines. The jets are turned on periodically as shown by the designation $t_{on}$, meaning "time on." The shape of the limit cycle is dependent upon the nature of the bias torques. For no bias torque, a limit cycle such as shown in FIG. 1 can result; for a constant bias torque that of FIG. 2 can result. In the instance of a constant bias, the limit cycle is a set of parabolas. The case of a varying bias torque is illustrated by the limit cycle of FIG. 3 made up of a series of unequal parabolic segments. The limit cycles illustrated in FIGS. 1-3 are obviously extravagant as to the numbers of thrust actuations although only that of FIG. 1 is clearly extravagant as to fuel if it is assumed that the relationship of fuel/thrust remains linear. In the example of FIG. 1, fuel is used to counteract attitude error created by attempted attitude correction. The perfect situation, of course, would be a limit cycle straight down the center for a no bias environment and for a bias environment one in which the apices of the parabolas came to just within the tolerance limit. As a practical matter such ultimate cycles are not readily attainable but the subject invention will attain the optimized results illustrated in FIGS. 4, 5 and 6 for commonly encountered environments.

It is noteworthy that in the illustrations of FIGS. 4, 5, 6 and 9 that the slope of the trajectories is representative of velocity and that the curvatures are commensurate with accelerations.

The invention can be applied to attitude control of a space vehicle by means of devices to measure variable parameters and computation devices to use those measurements and preestablished constants of the system to produce the appropriate time and duration of time for operation of the vehicle jets. Total control is best viewed as three separate problems of rotation, one about each of the orthogonal vehicle axis. The appropriate parameters to be measured, constants to be used and computations to be made can be determined from the rotational momentum to be imparted to the vehicle as it approaches a limit of error tolerance to send it, in the case of a bias field, to just short of the opposite limit or, in the case of no bias, in the other direction with a momentum that should increase the time until the next approach to a limit. In a bias situation the angular velocity, to be imparted to the vehicle can be determined by noting that if $\theta$ = Angular displacement $2\theta_M$ = Width of the permissible zone centered on $\theta = 0$ $\alpha$ = Angular acceleration = $\frac{d\theta}{dt} = \ddot{\theta}$ where $\omega$ = Angular velocity = $\frac{d\theta}{dt} = \dot{\theta}$ $\omega_c$ = Angular velocity to be imparted to vehicle $\alpha_o$ = Vehicle acceleration $\alpha_B$ = Acceleration due to bias, the angular velocity to counteract the effect of bias acceleration can be determined from $$\frac{d\omega}{dt} = -\alpha_B \text{ and } \frac{d\omega}{d\theta}\frac{d\theta}{dt} = -\alpha_B \quad (1)$$

so that $$\omega d\omega = -\alpha_B d\theta \quad (2)$$

which can be integrated over the permissible zone $$\int_{\omega_o}^{0} \omega d\omega = -\alpha_B \int_{-\theta_M}^{\theta_M} d\theta \quad (3)$$

$$0 - \frac{\omega_o^2}{2} = -\alpha_B[\theta_M - (-\theta_M)] = -\alpha_B 2\theta_M \quad (4)$$

to produce $$\omega_o = 2(\alpha_B \theta_M)^{1/2} \quad (5)$$

as an expression of the velocity to be imparted to the vehicle in terms of the bias acceleration. To determine the "ontime" of the thrusters, where $\alpha_c$ = The effective correction acceleration of the thrusters or plant constant, $I_v$ = Vehicle inertia, $T_o$ = Torque, $\omega_o$ = Angular velocity of vehicle prior to thrust, $t$ = Time, noting that $$\alpha_o = \frac{T_o}{I_v}$$

and that $$\alpha_o t = \omega_o + \omega_c$$

then $$t_{on} = \frac{\omega_o + \omega_c}{\alpha_c} \quad (6)$$

and where $\alpha_o$ is much larger than $\alpha_B$:

$$t_{on} = \frac{1}{\alpha_o}(\omega_o + \omega_c) = \frac{1}{\alpha_c}[\omega_o + 2(\alpha_B \theta_M)^{1/2}] \quad (7)$$

would provide for an "ontime" in terms of velocities and a plant constant $\alpha_c$.

The plant constant in terms of a control acceleration $\alpha_c$ being a ratio of control torque to vehicular moment of inertia is of course affected by variations of the internal system parameters such as center of mass, thrust level, thruster alignment, etc. In order to achieve a self adaptive capability the plant constant must reflect present fact and must therefore be continually recalculated. Recomputation or recalibration although attainable in many ways can be accomplished by measurement of the result of the last previous thrust. And if $\omega_{cm}$ = a measured angular velocity of the vehicle $\alpha_c'$ = a new plant constant then $$\omega_{cm} = \alpha_c' t_{on} - \omega_o \quad (8)$$

or $$\alpha_c' = (\omega_{cm} + \omega_o)/t_{on} \quad (9)$$

provides for upgrading the plant constant.

Figure 4:
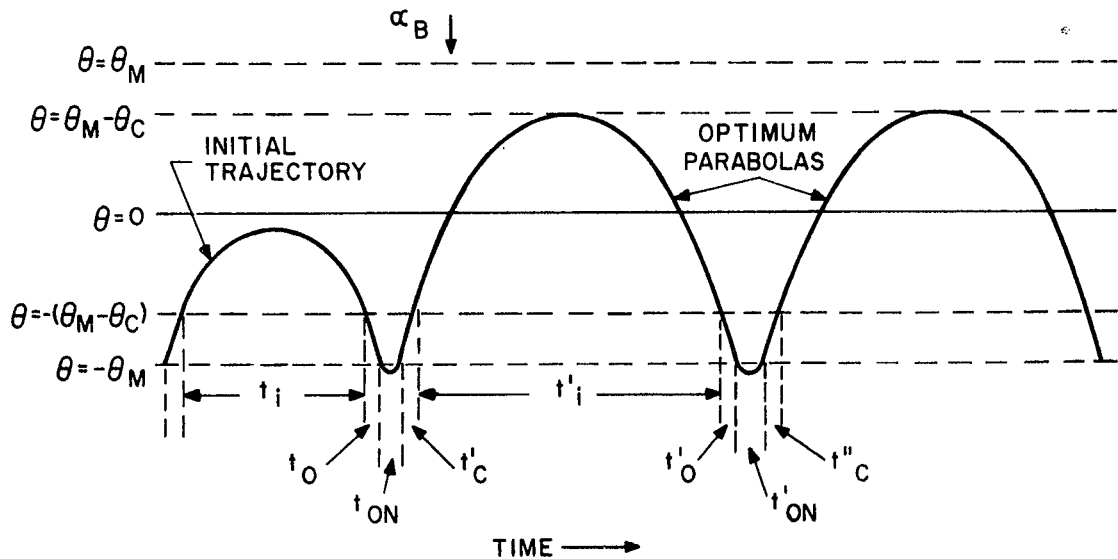
FIG. 4 is a graphic representation of the attitude limit cycle of a space vehicle utilizing a self-optimizing and adaptive attitude control according to the present invention in a bias environment.
Figure 5:
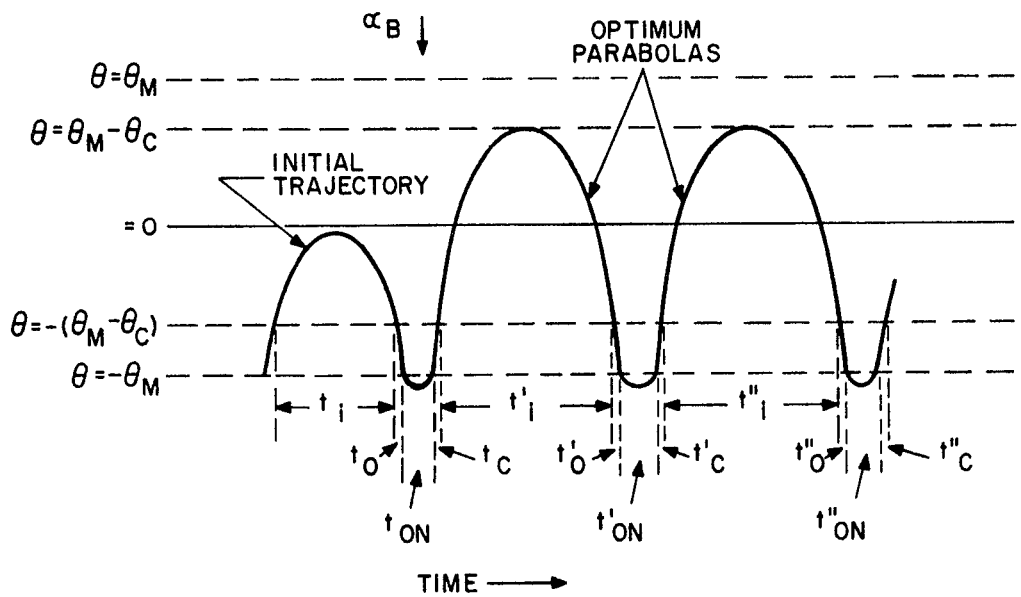
FIG. 5 is a graphic representation of an attitude limit cycle of a space vehicle utilizing a self-optimizing and adaptive attitude control according to the present invention but in a higher bias environment than that illustrated in FIG. 4.

Normal usage is enhanced by use of critical zones of width $\theta_r$ at the edges of the permissible zone, as illustrated in FIG. 4 and 5, to give additional time references. The critical zones can have their exterior edges contiguous with the boundaries of the permissible zone or the critical zones can be set slightly inside the permissible zone to allow for a "turn around" space still within the permissible zone. The examples illustrated in FIGS. 4 and 5 are of the contiguous arrangement. Examination of trajectories in general on the basis of displacement indicates that $$\theta = \theta_o + \dot{\theta}t + \tfrac{1}{2}\ddot{\theta}t^2 = \theta_0 + \omega t + \tfrac{1}{2}\alpha t^2 \quad (10)$$

where $\theta_o$ is an original position and as a function of time $$\theta_{(t)} = -\theta_M + \omega_o t - (\alpha_B t^2/2) \quad (11)$$

Solution of equation (11) for the two intercepts with $\theta = -\theta_M + \theta_c$ gives for one intercept:

$$-\theta_M + \theta_c = -\theta_M + \omega_o t_o - \frac{\alpha_B t_o^2}{2}$$

or $$\theta_c = \omega_o t_o - \frac{\alpha_B t_o^2}{2} \quad (12)$$

and for the other $$\theta_o = \omega_o(t_o + t_i) - \frac{\alpha_B(t_o + t_i)^2}{2} \quad (13)$$

where $t_o$ = time duration of crossing (i.e. passing completely through) critical zone under influence of bias $t_c$ = time duration of crossing (i.e. passing completely through) critical zone of correction (i.e. under the influence of a corrective force)

$t_i$ = time between penetrations of critical zone i.e. the time for traverse of that portion of the permissible zone lying between critical zones.

Note, for situations in which $\alpha_B$ is constant, $t_o = t_c$.

Simultaneous solutions of (12) and (13) yield:

$$\alpha_B = \frac{2\theta_c}{t_o(t_o + t_i)} \quad (14)$$

$$\omega_o = \frac{\theta_c(2t_o + t_i)}{t_o(t_o + t_i)} \quad (15)$$

These latter expressions permit the calculation of an optimal $t_{on}$ based on the concept that the optimal trajectory in a constant bias environment would be parabolic and penetrate the dead band to just short of the opposite critical zone. Therefore the depth of the parabola would be $2\theta_M - \theta_c$. Penetration of the opposite critical zone would lengthen the time between corrections but would complicate control procedures. Accordingly, one criteria in establishment of critical zone depths is that a narrow zone can serve to lengthen the parabolas. Actual computation based on equations (7), (14) and (15) yields:

$$t_{on} = \frac{1}{\alpha_c} \left\{ \frac{\theta_c(2t_o + t_i)}{t_o(t_o + t_i)} + 2\left[ \frac{2\theta_c}{t_o(t_o + t_i)}\left(\theta_M - \frac{\theta_c}{2}\right)\right]^{1/2} \right\} \quad (16)$$

which in an expression for the $t_{on}$ required arc through a parabolic path to the $\theta_M - \theta_c$ line illustrated in FIGS. 4 and 5. In use, in the situations illustrated in those FIGS. 4 and 5, a calculation of $t_{on}$ is followed by computation of a revised plant constant $\alpha_c$ using a newly measured $t_c$ and a measured velocity $\omega_{cm}$ as the vehicle rolls back through the critical zone. Noting equation (11) and that at $t = t_c$, $$\theta = -\theta_M + \theta_c - M - \theta_c = -\theta_M + \omega_{cm} t_c - (\alpha_B t_c^2/2) \quad (17)$$

if $$\omega_{cm} = \alpha_c' t_{on} - \omega_o \quad (18)$$

which is an expression of the fact that the measured rate is the velocity ($\alpha t$) imparted by the thrust minus the rate prior to the thrust.

$$\alpha_c' = \frac{1}{t_{on}}\left[ \omega_o + \frac{\theta_c}{t_o} + \frac{\alpha_B t_o}{2}\right] \quad (19)$$

and using (14) and (15) above $$\alpha_o' = \frac{\theta_c}{t_{on}}\left[\frac{2t_o + t_i}{t_o(t_o + t_i)} + \frac{1}{t_o} + \frac{t_o}{t_o(t_o + t_i)}\right] \quad (20)$$

This upgraded $\alpha_c$ then is used in the calculation of the next thruster "ontime." $t_{on}$ and provides for vehicle correction based on the most recent information.

Figure 6:
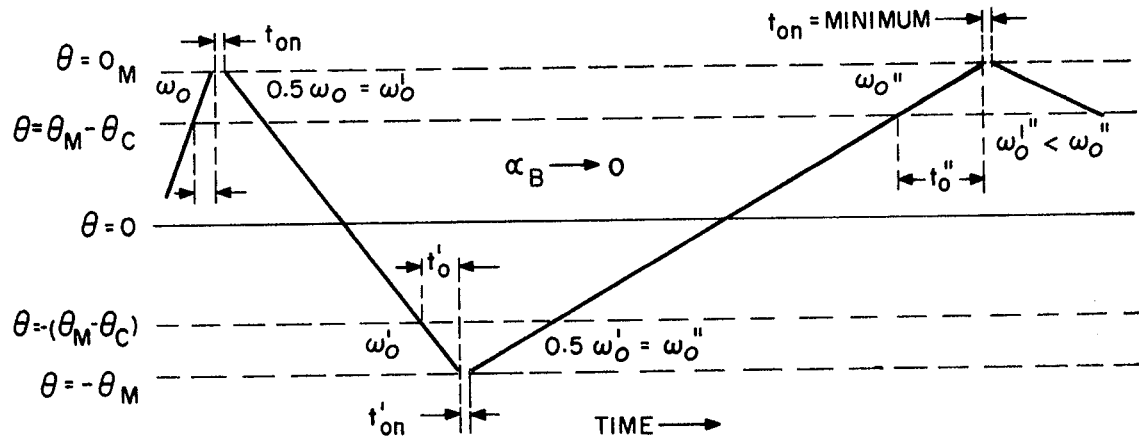
FIG. 6 is a graphic representation of the attitude path of a space vehicle utilizing a self-optimizing and adaptive attitude control according to the present invention in an extremely low or no bias environment.

A no bias environment as illustrated in FIG. 6, or one in which bias is minimal or the initial "ontime" in an acquisition situation can be handled by use of a more simple formulation as it permits use of an arbitrary decision. In the example of FIG. 6 the objective is to slow down the oscillations and stretch out the intervals between jet activations. ONe way of accomplishing this is to impart to the vehicle in return only one-half the rate of which it arrived at the edge of the dead band. Therefore in terms of equation (6)

$$t_{on} = (\omega_o + \omega_c)/\alpha_c = 1.5\omega_o/\alpha_c \quad (21)$$

and since $$\omega_o = \theta_c/t_o$$
$$t_{on} = 1.5\theta_c/\alpha_c t_o \quad (22)$$

is an expression of "ontime" in terms of plant constant and the easily measured quantities of critical zone and time of passage through that zone.

For simplified reference, we shall refer to calculation of "ontime" by means of equation (22) for nonbias environments illustrated in FIG. 6 as "Mode A" and to calculations of "ontime" by means of equation (16) for relative constant bias or parabolic situations illustrated in FIGS. 4 and 5 as "Mode B." One difference between the two modes as easily ascertained from equations (16) and (22) is that Mode B equation (16) uses $t_i$ which is the time between two successive uninterrupted crossings of the same interior boundary of a critical zone. Another distinction readily apparent from comparison of FIGS. 4 and 5 with FIG. 6 is that for Mode A all four sensing levels are crossed in order. These distinctions are used in the sequencing logic.

Figure 7:
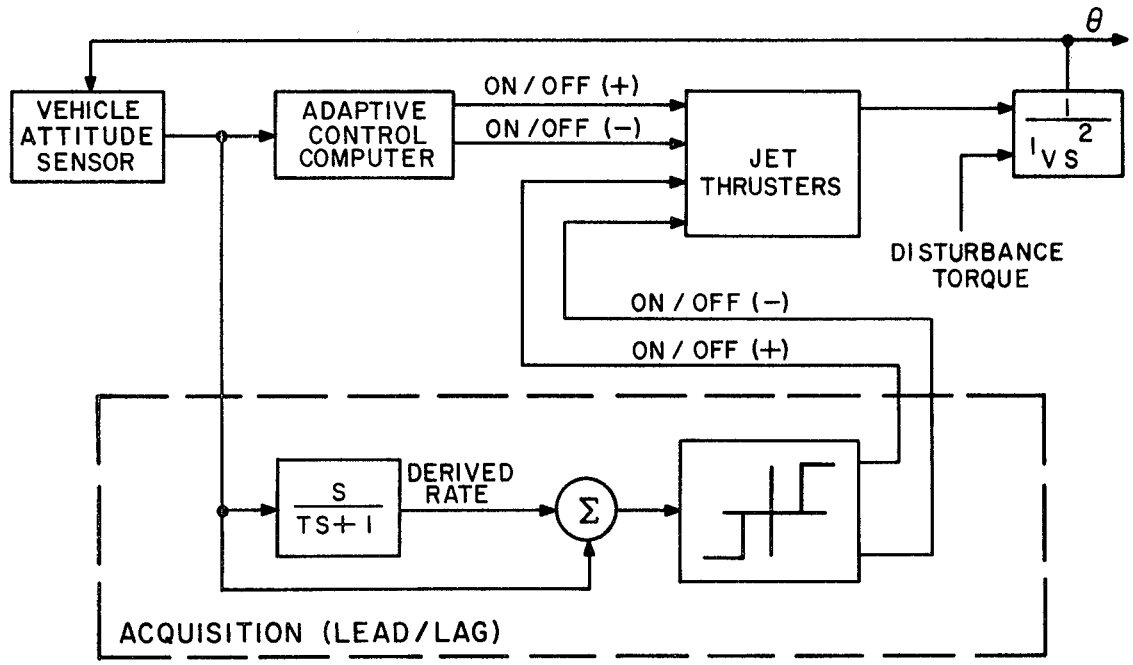
FIG. 7 is a block diagram of an apparatus to provide self-optimizing and adaptive attitude control about one axis according to the present invention.

A mechanization of an attitude control system for a single axis using the equations developed above for $t_{on}$ and $1/\alpha_c$ is shown in FIG. 7. It consists of jet thrusters, vehicle dynamics, vehicle attitude sensor, and control electronics. The control electronics consists of two distinct components, the adaptive control computer which performs the time measurements and computations necessary to generate $t_{on}$ (as described in equations), and the acquisition electronics which provides vehicle control when the vehicle attitude and/or angular rate is outside the adaptive control computer range. The adaptive control computer as indicated in FIG. 7 produces signals which are significant as to direction and time of application of the thrusters, i.e. the thruster force can be applied to torque the vehicle in either direction (+ or −) about the axis in question for a determined time so as to impart the correct momentum.

Figure 8:
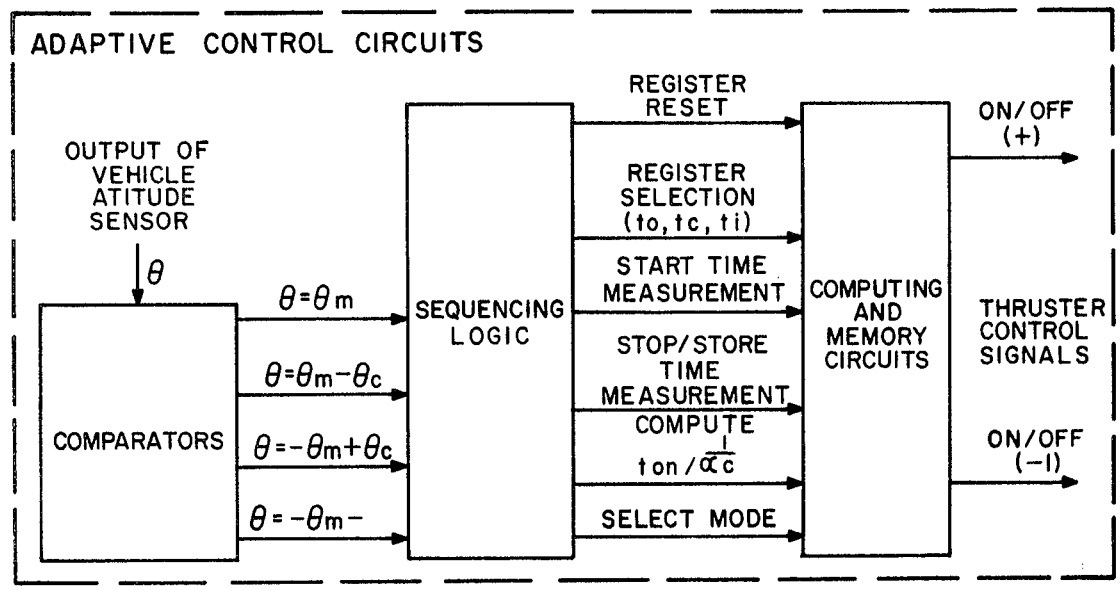
FIG. 8 is a block diagram of the adaptive control computer of FIG. 7.

The particular adaptive control computer shown in FIG. 7 has three distinct functional elements; the comparator, the sequencing logic, and the computing and memory circuits, as separately illustrated in FIG. 8. The comparator circuits compare the output signal as for example an analog voltage $\theta$ of the vehicle attitude sensor with predetermined voltage levels $\theta_m$, $\theta_m - \theta_c$, $-\theta_m + \theta_c$, $-\theta_m$ stored in the comparator and indicate when $\theta$ is equal to any one of these levels by producing a voltage pulse at the appropriate output (see FIG. 8). The sequencing logic, as shown in FIG. 8, uses the presence of the voltage pulses as well as their sequence, to generate command signals to the computing and memory circuits. The principal signals produced by the sequencing logic are "register reset," "register selection," "start time measurement," stop/store time measurement, compute and select mode as shown in FIG. 8. Their exact sequence is derived from the order and time of signals passing between the comparators and the sequencing logic. To illustrate, consider the sequence of events depicted in the hypothetical vehicle trajectory shown in FIG. 9 and the tabular description given below. The "event numbers" are the numbered successive points of FIG. 9 where the vehicle attitude triggers an established comparator voltage level. The hypothetical trajectory is one of acquisition by the attitude control system with an $\alpha_c$ but no other information in the system and develops into a bias situation.

| Event | Comparator output | Sequencing logic | Computing and memory |
|---|---|---|---|
| 1 | $\theta = \theta_M$ | | $t_c$ exists |
| 2 | $\theta = \theta_M$ $\theta_c$ | Reset all registers Start $t_i$ | |
| 3 | $\theta = \theta_M + \theta_c$ | Stop $t_i$ Start $t_o$ | |

| | | | |
|---|---|---|---|
| 4 | $\theta = -\theta_M$ | Stop $t_o$ Select Mode A Select $t_{on}$ | Discard $t_i$ Store $t_o$ |
| 5 | $\theta = -\theta_M$ | | |
| 6 | $\theta = -\theta_M + \theta_o$ | Start $t_i$ | |
| 7 | $\theta = -\theta_M + \theta_o$ | Stop $t_i$ Start $t_o$ | Store $t_i$ |
| 8 | $\theta = -\theta_M$ | Stop $t_o$ Select Mode B Select $t_{on}$ | Store $t_o$ Compute $t_{on}$ Activate thruster |
| 9 | $\theta = -\theta_M$ | Start $t_o$ | |
| 10 | $\theta = -\theta_M + \theta_o$ | Stop $t_o$ Select $1/\alpha_c$ Reset all registers Start $t_i$ | Compute $1/\alpha_c$ Store $1/\alpha_c$ |
| 11 | $\theta = -\theta_M + \theta_o$ | Stop $t_i$ Start $t_o$ | Store $t_i$ |
| 12 | $\theta = -\theta_M$ | Stop $t_o$ Select Mode B Select $t_{on}$ | Store $t_o$ Compute $t_{on}$ Store $t_{on}$ |

Figure 9:
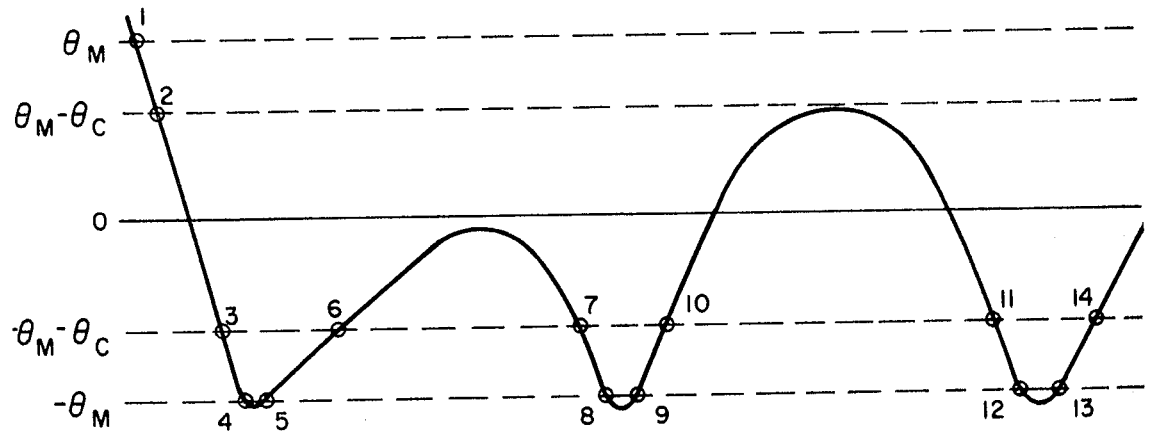
FIG. 9 is a graphic representation of a particular hypothetical sequence to show the manner of operation of an apparatus such as that of FIG. 7.

FIG. 9 and the foregoing tabulations make it apparent that mode selection can be made responsive to comparator outputs. If all four thresholds are crossed in sequence, Mode A is selected; if two thresholds are crossed and then recrossed, Mode B is selected. Mode selection, computation and thruster activation can all follow from the $\theta_M$ or $-\theta_M$ crossing since the mechanics of the situation are not so time critical that an interval of 2-3 seconds for threshold sensing to thruster activation would be detrimental. Problem cycles run from recomputation of $1/\alpha_c$ which is responsive to crossing of critical zones inwardly with data available for computation. No such computation occurred at event 2 in FIG. 9 since there was not storage. Selection and measurement of $t_c$ and storage of $t_i$ occur only in Mode B since those quantities are not needed for $t_{on}$ computations in Mode A. Nor is $1/\alpha_c$ as critical in Mode A since successive thrusts are based on halving the previous rate of movement as previously explained in connection with FIG. 6 which has the incidental effect of halving an existing error. The sequencing logic also provides for odd occurrences such as extreme parabolic trajectories that either do not leave the base critical zone or penetrate the opposite critical zone.

Acquisition electronics are used to activate the thrusters to control the vehicle when the attitude error is greater than the range of the adaptive control computer. Such instances occur when the vehicle is being maneuvered to a new desired attitude or upon initial separation from the launch vehicle. The acquisition electronics shown in FIG. 7 are the standard or conventional "lead-lag" system that is currently in use on many space vehicles. This control system is of the "derived-rate" type and switches on the thruster when the rate plus attitude error is above a level specified by the "level detector." For use in combination with the adaptive control computer, the level detector is selected to be greater than $\pm\theta_M$ to minimize interaction. The acquisition system reduces the vehicle rate and position to within the range of the adaptive control computer and then remains quiescent until vehicle attitude becomes greater than the computer range.

The invention can be mechanized by means of analog and digital electronic circuits to comprise the comparators, sequencing logic and the computing and memory circuits making up the adaptive control computer as shown in the functional diagram of FIG. 8. The particular arrangements disclosed are designed to facilitate use of integrated circuit techniques. All descriptions for the sake of simplicity assume a single axis system with the understanding that multiple-axis systems are merely repetitious, either completely so or with some components serving a plurality of axes as for example on a time share basis.

The focal point of the adaptive control computer is the computing and memory circuits which perform various arithmetic acts such as Add, Subtract, Multiply, Divide in appropriate sequence to perform the computations expressed mathematically by equations (16) and (22) to produce the proper ontime, $t_{on}$, and by equation (20) to produce a quantitative plant constant $\alpha_c'$. These circuits are made up of three discrete basic elements; (1) memory element, (2) binary rate multiplier and (3) up/down counter in addition to well known electronic components such as clock circuits. The following descriptions of these elements is adequate to permit those skilled in the art to use the invention through implementation in one or more ways readily recognizable in the art. Complete detailed circuitry is not necessary because of the number of possible configurations.

Further details pertaining to basic elements and information concerning their integration into a cooperating structure can be obtained from U.S. Pat. Nos. 3,263,066; 3,443,074; and 3,456,099; and from *Electronic Analog Digital Conversions*, H. Schmid, Van Nostrand Reinhold Co., New York 1970. The U.S. Pat. No. 3,443,074, H. Schmid, May 6, 1969 is an example of computer organization and sequential timing of operations similar to that to be implemented in the present invention and constitutes general guidance for implementation by those skilled in the art.

MEMORY ELEMENT

Figure 10:
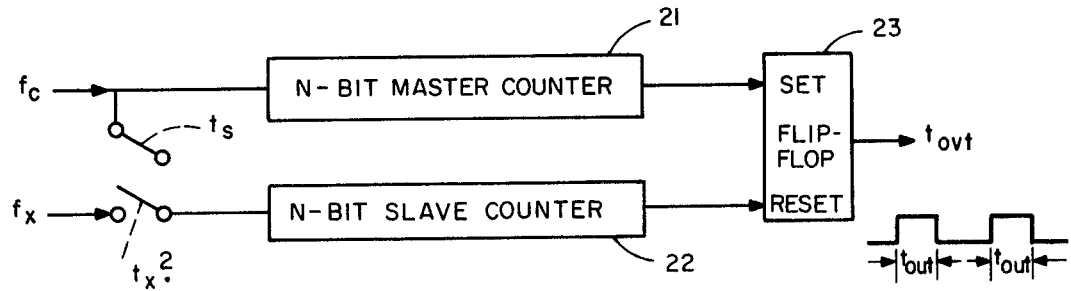
FIG. 10 is a block diagram of a memory element.
Figure 11:
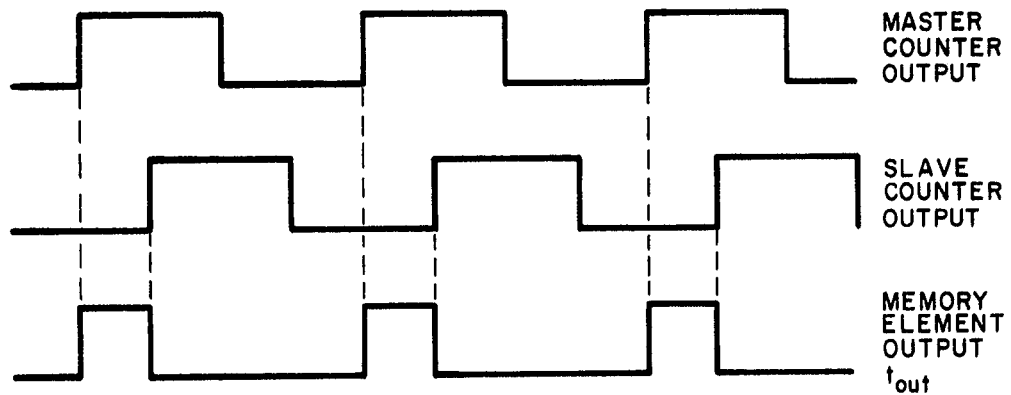
FIG. 11 is a diagram of the relationship among the square wave outputs of the master counter, slave counter and the memory element.

A memory element according to the block diagram of FIG. 10 is used to store problem variable or computed values, as for example a value of $\alpha_c'$, which after computation must be retained for the subsequent computation of $t_{on}$. Storage is accomplished by converting the quantity to be stored (e.g. $\alpha_c'$) into a pulse width modulated voltage signal which keeps repeating driven by the clock frequency thereby storing the information carried in the form of the interrelationship among succeeding pulse widths. This is accomplished by use of a clock driven master counter 21 to generate master timing signals and a slave counter 22 in such a way that the phase difference between them produces the desired pulse width modulated signal as illustrated in FIG. 11. If the slave counter 22 is driven by a clock having frequency $f_c$ and if the two counters, master and slave, are started together, the two inputs to flip-flop 23 occur simultaneously to produce no net output. However, if the slave counter contains an initial count, and the two counters 21, 22 are driven by the clock, the outputs of the two counters will be out of phase by an amount proportional to the initial count. The flip-flop converts this phase difference to a pulse width modulated voltage signal. The frequency $f_x$ produces the initial count in the slave counter. U.S. Pat. No. 3,443,074, H. Schmid, May 6, 1969, also provides specific information pertaining to a compatible memory element, see FIG. 3 and columns 3 and 4 of the patent.

BINARY RATE MULTIPLIER

Figure 12:
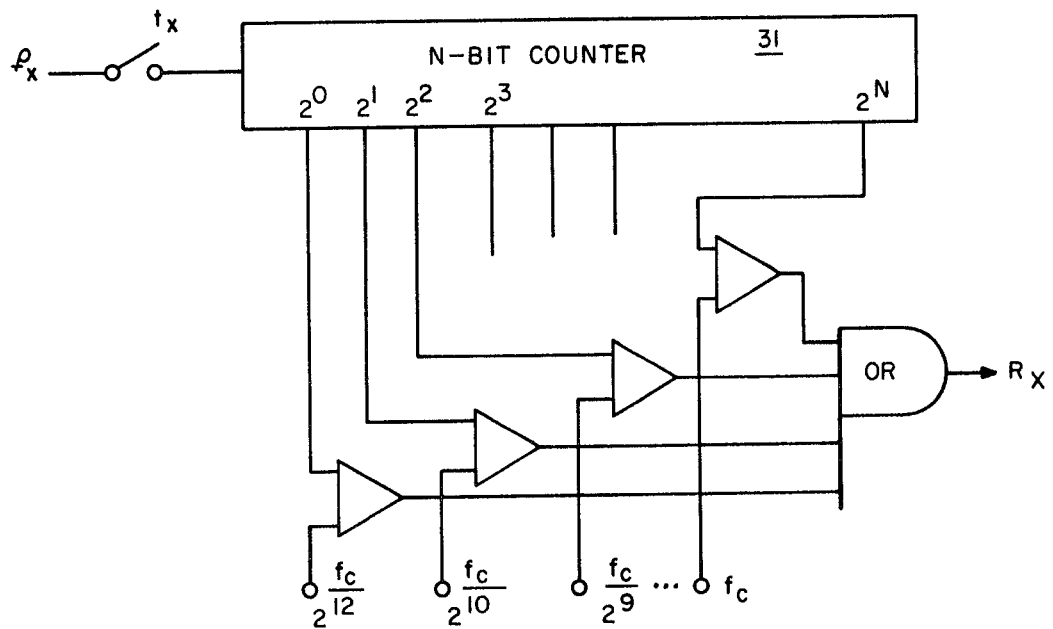
FIG. 12 is a block diagram of a binary rate multiplier.

A binary rate multiplier according to the block diagram of FIG. 12 is used to add and multiply variables and to convert pulse width modulated signals to pulse rate modulated signals. The multiplier operates responsively to the gating of pulsed voltage signals of various frequencies by the output of a counter. The initial count in the N-bit counter 31 is applied by gating a fixed frequency $f_x$ for a discrete amount of time $t_x$, producing in the counter the count of $f_x t_x$. The binary rate multiplier produces a pulse rate modulated signal wherein the pulse rate is the sum of the several rates gated by each stage of the counter. With a basic clock frequency of $f_c$, the output pulse rate increases $f_c/2_N$ Hertz for each input count to produce an output pulse rate from the binary rate multiplier that is proportional to $f_x t_x$ so that the binary rate multiplier can be used either to multiply or to sequentially add two variables. Further information concerning this type circuitry can be obtained from U.S. Pat. No. 3,456,099, Grindle et al., July 15, 1969.

UP/DOWN COUNTER

Figure 13:
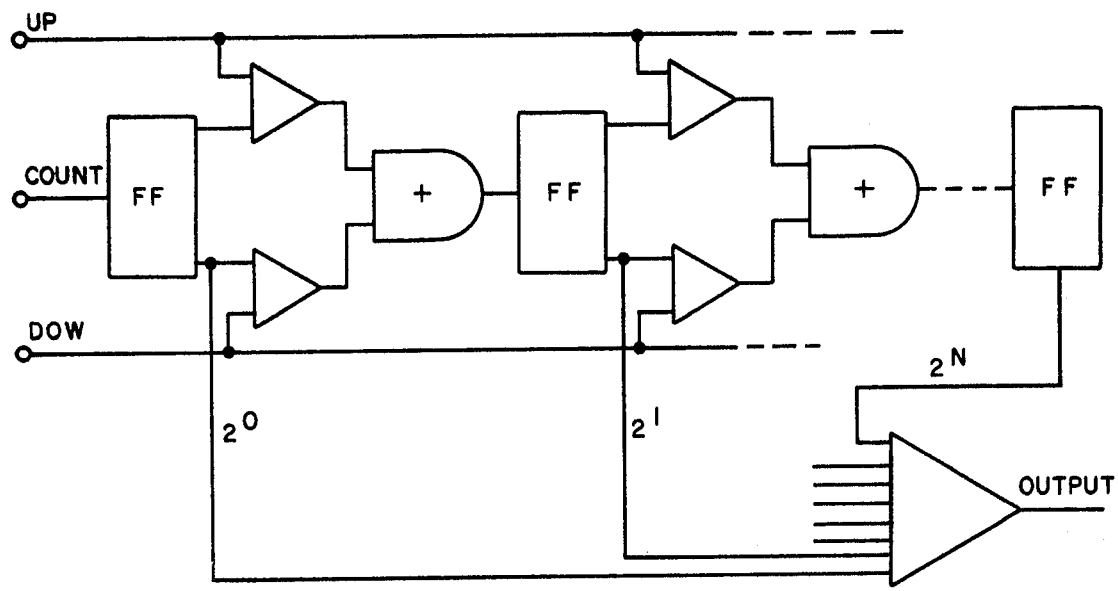
FIG. 13 is a block diagram of the up-down counter.

An up/down counter, of which FIG. 13 is a block diagram, is used to perform addition, subtraction, division, multiplication and square root operations. Complete mechanization can be either by counting a pulse rate signal over time periods or by measuring the time required to empty or "down count" a counter at a set rate. In the U/D counter shown in FIG. 13, the output of the AND gate is zero only when the counter is empty. To demonstrate the division operation, assume that a frequency $f_x$ is counted, up, for a time $t_x$ so that:

$$\text{Up count} = \int_0^{t_x} f_x dt = f_x t_x$$

The counter is now counted down at a rate $f_y$ so that:

Down count $= f_y t_y$ where $t_y$ is the period required to empty the counter. Since the up and down counts are equal, $t_y = f_x t_x / f_y =$ output pulse width.

The square root operation is performed by counting a number down using a frequency ramp where $f = 2f_c t/T$ to count down. If the $$\text{up count} = t_x f_x = \text{down count} = \int_0^t \frac{2f_c t}{T} dt = \frac{f_c t^2}{T},$$

then the output pulse width $t = (T/f_c) t_x f_x$. Further information of value in the implementation of up/down counters may be found in chapter 8, pages 238 and 239 of Schmid's book cited above.

ADAPTIVE CONTROL COMPUTER

The three basic building blocks, memory element, binary rate multiplier and up/down counter described perform all the arithmetic operations needed to compute $t_{on}$ and $\alpha_c'$. Computation of $t_{on}$ results in the production of a signal to the thrusters conveying the information of the length of time that the thrusters should be turned on. The mechanization described uses a pulse duration signal. The completely mechanized apparatus for the computing and memory circuits consists of a combination of seven of these building blocks; three memory elements, three binary rate multipliers and one up/down counter. Because of the time available in the usual spacecraft attitude control problem (i.e. 200 seconds between $t_{on}$'s) the adaptive control computer works sequentially to reduce the amount and complexity of circuits needed. The total computation time for $t_{on}$ and $\alpha_c'$ is divided into subintervals and different elements are commanded to perform different functions during each subinterval. For example, the up/down counter may be commanded to divide during one period and to compute a square root during another.

Control and command of the elements of the computing and memory circuits are accomplished by the sequencing logic (see FIG. 8). This digital logic circuitry selects the elements to be used during each computing subinterval and the mode in which they are to be used (subtraction, addition, storage, etc.). The sequencing logic also contains the various frequency generation circuits for the adaptive control computer as well as digital building blocks such as AND, OR, NOR, to accomplish the computation control function.

The adaptive control computer diagrammed in FIG. 8, in addition to the computing and memory circuits and sequencing logic just explained, also contains comparators for comparing the attitude signal outputs of the vehicle attitude sensors with self-contained signals representing the predetermined thresholds to determine when a corrective action sequence should be started. This function is accomplished in the preferred embodiment wherein the vehicle sensors produce analog voltages through the use of an analog voltage switch for each threshold or critical value. The timing and sequencing of these switches provide the information needed by the sequencing logic to control computation of $t_{on}$ and $\alpha_c'$.

We claim:

1. An attitude control system for maintaining a body within predetermined limits of deviation from a desired attitude with respect to an axis of that body about which said body has freedom of movement comprising:

a. an attitude sensor producing an electric attitude signal representing the orientation of said body as measured about said axis of said body, b. torquing means for applying a force in at least one of several predetermined directions in response to electrical signals to move said body about said axis to change its orientation with respect to said axis, and c. an electronic adaptive control computer responsive to said attitude signals for generating signals for starting and stopping said torquing means to maintain said body within said predetermined limits of deviation including:

1. comparator means for comparing said attitude signal with stored reference signals representing predetermined amounts of deviation from said desired attitude and generating distinct limit signals indicating the time at which said attitude signal equals any of said reference signals, 2. sequencing logic responsive to said limit signals and to the sequence in which said limit signals occur for generating logic signals, and 3. computing and memory circuits responsive to said logic signals, to preset values and to time for generating said electrical signals to which said torquing means is responsive to maintain said body within said predetermined limit of deviation.

2. The attitude control system of claim 1 wherein said torquing means when actuated applies a constant force and said electrical signals generated by said computing and memory circuits constitute pulse duration signals conveying a time for actuation of said torquing means.

3. The attitude control system of claim 2 wherein said logic signals generated by said sequencing logic indicate a first mode of computation in response to a sequence of said limit signals indicating a situation in which attitude deviation of said body is a result of random drift and indicate a second mode of computation in response to a sequence of limit signals indicating a situation in which attitude deviation of said body is a result of a bias force.

4. The attitude control system of claim 3 wherein said stored reference signals include two maximum deviation signals $\pm\theta_M$ and two secondary deviation signals $\pm(\theta_M-\theta_c)$ representing deviations symmetrically centered on said desired attitude to define a permissible zone $2\theta_M$ of deviation subdivided into a central zone $2(\theta_M-\theta_c)$ bordered by two critical zones $\theta_c$ and wherein said preset values include a stored signal $\alpha_c$, a plant constant correlating the effectiveness of said torquing means to the system.

5. The attitude control system of claim 4 wherein said computing and memory circuits generate said pulse duration signal to have a pulse duration time $t_{on}$ according to:

in said first mode:
    $$t_{on} = (1.5\theta_c)/(\alpha_c t_o) \quad (22)$$
    in said second mode:
    $$t_{on} = \frac{1}{\alpha_o} \left\{ \frac{\theta_o(2t_o+t_i)}{t_o(t_o+t_i)} + 2\left[ \frac{2\theta_o}{t_o(t_o+t_i)} \left(\theta_M - \frac{\theta_o}{2}\right) \right]^{1/2} \right\} \quad (16)$$
    wherein:

$t_o =$ time of crossing critical zone $\theta_c$ in deviation $t_i =$ time within the central zone.

6. The attitude control system of claim 5 wherein said electrical signals generated by said computing and memory circuits in said second mode also includes a signal representing a new plant constant $\alpha_c'$ computed from the results of the preceding correction of the deviation of said body according to:

$$\alpha_o' = \frac{\theta_o}{t_{on}} \left[ \frac{2t_o+t_i}{t_o(t_o+t_i)} + \frac{1}{t_c} + \frac{t_o}{t_o(t_o+t_i)} \right] \quad (20)$$

wherein $t_c =$ time of crossing critical zone in correction.

7. An apparatus for determining and applying an attitude correcting force to a body having rotational freedom about an axis to maintain said body within a predetermined limit of rotational error from a correct attitude with a minimum of correcting force comprising in combination:
   a. position sensing means for producing an error signal proportional to deviation of the body from the correct attitude;
   b. analog switch comparator means responsive to said error signal and to four zone boundary value signals preset in said comparator means for producing a distinct event signal indicating the occurrence of said error signal being equal to any said zone boundary value signal, said zone boundary value signals in pairs representing inner and outer zones of permissible rotational error centered on said correct attitude;
   c. electronic computer means responsive to said event signals, to stored signals carrying preset values, to time and to an established program for converting said event signals to directionally significant time duration signals, said computer being programmed to operate in a Mode A when said event signals occur in sequence from one extreme to the other indicating rotation of said body completely through said outer and inner zones and to operate in a Mode B when said event signals occur in a sequence of repetition indicating an oscillating rotation of said body about the borders of both said zones on one side of said correct attitude, said computer means producing said directionally significant time duration signals responsive to the sequence of passing said inner and outer permissible zone boundaries in that order, and said time duration signals being directionally significant to indicate the direction required for rotation of the body back into said zones; and,
   d. body torquing means responsive to said directionally significant time duration signal for applying a constant force to said body to torque said body about said axis in the direction and for the period of time prescribed by said directionally significant time duration signal.

8. The apparatus of claim 7 wherein said preset values carried by said stored signals include a plant constant $\alpha_c$ which is a measurement of the effectiveness of said torquing means and wherein said electronic computer means is also programmed in Mode B to modify said stored signals to update said preset values to include a new plant constant $\alpha_c'$.

9. The apparatus of claim 8 wherein said electronic computer is also programmed to store the time duration $t_{on}$ of said directionally significant time duration signals and to modify said stored signals according to:

$$\alpha_c' = \frac{\theta_o}{t_{on}} \left[ \frac{2t_o + t_i}{t_o(t_o+t_i)} + \frac{1}{t_o} + \frac{t_o}{t_o(t_o+t_i)} \right] \qquad (20)$$

where, in addition to $t_{on}$ and $\alpha_c'$:
   $t_i$ = time between successive said event signals indicating time within inner zone
   $t_o$ = time between successive said event signals indicating rotation of body from inner zone to outside of outer zone
   $t_r$ = time between successive said event signals indicating rotation of body from outside of outer zone to inside of inner zone.

10. The apparatus defined in any one of claims 7, 8 or 9 wherein the said established program includes as the relationship between $t_{on}$, the time duration of said directionally significant time duration signals and values defined by the other said signals:

in Mode A:

$$t_{on} = (1.5\ \theta_c)/(\alpha_c t_o) \qquad (22)$$

in Mode B:

$$t_{on} = \frac{1}{\alpha_o} \left\{ \frac{\theta_o(2t_o+t_i)}{t_o(t_o+t_i)} + 2 \left[ \frac{2\theta_o}{t_o(t_o+t_i)} \left(\theta_M - \frac{\theta_o}{2}\right) \right]^{1/2} \right\} \qquad (16)$$

wherein, in addition to $t_{on}$:
   $\theta_M$ = angular measurement about body axis of outer zone of permissible rotational error in one direction of deviation from the correct attitude
   $\theta_c$ = angular measurement of separation of inner and outer zones of permissible error in one direction of deviation
   $t_i$ = time between successive said event signals indicating time within inner zone
   $t_o$ = time between successive said event signals indicating rotation of body from inner zone to outside of outer zone
   $t_r$ = time between successive said event signals indicating rotation of body from outside of outer zone to inside of inner zone.

* * * * *